3,131,157
LIQUID RESINOUS COMPOSITION COMPRISING MELAMINE FORMALDEHYDE CONDENSATE AND NITRO COMPOUNDS
Joseph B. Hyman, Plainfield, Stanley Kordzinski, Old Bridge, and Charles Tyler Bills, South Plainfield, N.J., assignors to Catalin Corporation of America, a corporation of Delaware
No Drawing. Filed Oct. 5, 1960, Ser. No. 60,589
7 Claims. (Cl. 260—29.4)

This invention relates to liquid melamine resins modified with organic nitro compounds.

Liquid solutions of melamine resins present shipping and storage problems in that if the temperature of the solution falls below about 65° F. the resin tends to change to a thixotropic mass which is quite difficult to redissolve even on subsequent heating of the resin. For this reason it has been customary heretofore to ship and store the liquid resin composition at an elevated temperature, 75° F. or more, but this also has not been satisfactory since the composition tends to gel prematurely at the elevated temperature so that the storage life of the liquid composition is objectionably shortened. In most cases it has been necessary to spray dry the liquid composition into solid form in order to obtain extended storage life satisfactory for commercial purposes.

We have now found that the storage life and flow characteristics of liquid melamine resins can be substantially improved by incorporating an organic aliphatic nitro compound in the liquid resins. Such modified melamine resins can be stored in liquid form at elevated temperature without gelling for relatively prolonged periods of time in comparison to conventional liquid melamine resins which, as mentioned above, have very limited storage life when held at temperatures high enough to prevent thixotropic behavior of the resin. In addition to improving storage life the aliphatic nitro compound appears to lower the melt viscosity of the melamine resin when the resin is subjected to heat and pressure during cure and as a result the flow characteristics of the resin are substantially improved. When the modified resins are used for the preparation of laminates the improved flow characteristics lead to the formation of superior laminates having excellent color stability. Also, the aliphatic nitro compound appears to have beneficial surfactant properties which materially increases the speed and thoroughness with which the modified melamine resins penetrate the sheets of cellulosic laminates. Laminates prepared with the modified melamine resins also have superior gloss characteristics.

The liquid melamine resins which may be modified in accordance with our invention are solutions of resinous condensates of melamine and formaldehyde prepared from the reaction of about 1.5 to 4.5 mols of formaldehyde with 1 mol of melamine under mildly alkaline conditions. Condensates of melamine and formaldehyde which include minor amounts of urea, thiourea, aniline and sulfonamides as an initial reactant may also be modified with the aliphatic nitro compound. The melamine resinous condensates may be dissolved or dispersed in water, ethyl alcohol or mixtures thereof or in other organic solvents such as ketones, propyl, isopropyl and butyl alcohols. In the laminating trade the melamine resin is customarily used in the form of a 50 to 65% solution in a mixture of water and isopropyl alcohol. As mentioned hereinabove such a solution must be stored at temperatures higher than about 65° F. in order to prevent thixotropic behavior and yet, at the elevated temperature, the solution tends to prematurely gel. Modification with the aliphatic nitro compound substantially retards this tendency to gel so that the storage life of the solution is quite satisfactory. Also, it will be noted that none of the compounds we use need be separated from the resin solution at the time the resin is to be cured and in this sense our compounds are distinguished from some of the conventional shipping inhibitors which are added to resinous compositions temporarily to inhibit gelation during shipping or storage and which cannot be tolerated in the resinous composition during final cure. The nitro compounds we employ are completely compatible with the cured melamine resin and actually give substantial benefits during the final cure in terms of improved flow characteristics as mentioned above. Also, the nitro compounds do not cause any detectable change in the flexural characteristics of the cured melamine resin so that there is no plasticization of the cured resin to speak of. This is of advantage since formulations of the melamine resin having known final flexural characteristics need not be changed to account for any plasticizer effects of the nitro compound.

The aliphatic nitro compounds which improve the storage life and flow characteristics of the liquid melamine resins in accordance with the invention may be represented by the general formula:

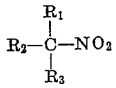

in which $R_1$ is hydrogen or methylol, $R_2$ is hydrogen or $C_nH_{2n+1}$ and $R_3$ is hydrogen, methylol or $C_nH_{2n+1}$, $n$ being an integer from 1 to 12. These nitro compounds may be prepared in conventional manner and may be added to the liquid melamine resin at atmospheric or higher temperatures at any time after the condensation reaction has been completed. It is preferred that the nitro compound be water soluble and therefore of low molecular weight since the melamine resins are ordinarily diluted with a mixture of water and alcohol in commercial laminating applications. However, the higher molecular weight water insoluble nitro compounds may be employed for applications where organic solvents can be tolerated. Some of the nitro compounds with which we have achieved excellent results are nitroethane, 2-nitropropane, 2-nitro-1-butanol and 2-nitro-2-ethyl-1,3 propanediol.

As to proportions the nitro compound alone may be added to a 60% solution of the melamine resin in water or mixtures of water and minor amounts of isopropyl alcohol in amounts ranging from about 0.3 to about 8% by weight based on the weight of the solution. Higher amounts of nitro compound, up to about 12% based on the weight of the solution, may also be used but when the concentration of the nitro compound exceeds about 8% special precautions should be taken to avoid premature gelation of the melamine resin. Nitro compound concentrations of higher than about 8% reduce the pH of the resin solution, perhaps because of decomposition and formation of nitrogen acids, and this reduction of pH tends to gel the melamine resin which ordinarily gels in acid medium. We have found that the reduction of pH and consequent tendency toward premature gelation can be effectively counteracted by adding a quaternary ammonium hydroxide compound having from one to four hydroxyalkyl groups to the modified melamine resin solution whenever the concentration of the nitro compound therein exceeds about 8% of the weight of the solution. The quaternary ammonium hydroxide compound permits the use of nitro compound concentrations up to about 12% and higher without any adverse effects before or during cure so that the storage life of the melamine resin can be extended substantially beyond what storage life can be achieved at the 8% or lower concentrations. Also, the quaternary ammonium hydroxide compound generally increases the water tolerance of the modified melamine resin solution over a period of time and this is always desirable in water soluble type resins.

From the foregoing it is obvious that within the limits and conditions described the overall concentration of the aliphatic nitro compound can be from about 0.3% to about 12% by weight based on the weight of the melamine resin solution with the quaternary ammonium hydroxide compound being included when the nitro compound concentration is about 8% or more. We prefer to use between about 1% and 8% of the nitro compound based on the weight of the melamine resin solution. These amounts of the nitro compound if based on the weight of the resinous melamine bodies in the solution are an overall range of from about 0.5% to about 25%. The preferred range is about 1.5% to about 13% of the weight of the resinous melamine bodies and the quaternary ammonium hydroxide compound is included whenever the amount of nitro compound based on the weight of resinous solids is about 13% or more.

As to the quaternary ammonium hydroxide compound, this may be an alkyl or aryl ammonium hydroxide having from one to four hydroxyalkyl groups. For example, 2-propanol triethanol ammonium hydroxide, diphenyl diethanol ammonium hydroxide, trimethyl ethanol ammonium hydroxide and tetra-2-propanol ammonium hydroxide may be employed. The amount of the quaternary ammonium hydroxide is not critical and even very small amounts will be effective. Generally we add from about 0.25% to about 2% by weight of quaternary ammonium hydroxide based on the weight of the modified 60% melamine resin solution. These weights of quaternary ammonium hydroxide will be from about 0.4% to 3.5% when based on the weight of the resinous melamine bodies in such 60% solution. As with the nitro compound the quaternary ammonium hydroxide may be added to the melamine resin at any time after the condensation reaction has been completed.

In the foregoing description of our invention we have described various materials that may be used and their equivalents and ranges, limits and conditions within which our invention may be practiced. In the following examples we set forth the best mode contemplated by us of carrying out our invention but it is to be understood that these examples are not to be taken as limiting our invention. Unless stated otherwise the amounts given in terms of parts or percentages are based on the weights of the materials.

Example 1

*Resin A.*—3542 parts of melamine were added to 6267 parts of a 37% aqueous formaldehyde solution and the pH of the slurry was adjusted to 8.4 with sodium hydroxide. The mixture was heated to reflux and maintined at reflux until one part of the resinous condensate formed a cloud when diluted with 2.5 to 3.0 parts of water. The pH was then adjusted to 10.4 with sodium hydroxide, 99 parts of isopropyl alcohol were added and the resin solution was cooled.

*Resin B.*—40 parts of 2-nitro-2-ethyl-1,3 propanediol and 5 parts of 2-propanol triethanol ammonium hydroxide were added to 1000 parts of Resin A and the mixture was agitated until solution was complete.

*Resin C.*—40 parts of 2-nitro-2-ethyl-1,3 propanediol and 10 parts of 2-propanol triethanol ammonium hydroxide were added to 1000 parts of Resin A and the mixture was agitated until solution was complete.

Aging properties of Resins A, B and C at 25° C. were as follows:

|  | Resin A | Resin B | Resin C |
| --- | --- | --- | --- |
| Initial viscosity, poises at 25° C | 1.00 | 1.02 | 0.97 |
| Days for viscosity to reach 2.0 poises | 22 | 58 | 53 |
| Days for viscosity to reach 2.5 poises | 36 | 71 | 76 |

Example 2

A liquid melamine resin was prepared in the manner described in Example 1 with 3246 parts of melamine and 6267 parts of 37% aqueous solution of formaldehyde. 90 parts of isopropyl alcohol was added to the resin solution and a series of mixes of this resin with 2-nitro-2-ethyl-1,3 propanediol and 2-propanol triethanol ammonium hydroxide were prepared and evaluated for ageing properties as follows:

|  | Mix No. 1 | Mix No. 2 | Mix No. 3 | Mix No. 4 | Mix No. 5 | Mix No. 6 | Mix No. 7 |
| --- | --- | --- | --- | --- | --- | --- | --- |
| 2-nitro-2-ethyl-1,3 propanediol, percent added | | | 4 | 8 | 4 | 8 | 12 |
| 2-propanol triethanol ammonium hydroxide, percent added | | 0.5 | | | 0.5 | 0.5 | 0.5 |
| Aging Properties at 25° C.: | | | | | | | |
| Initial viscosity, poises | 1.25 | 1.29 | 1.14 | 1.04 | 1.00 | 0.88 | 0.81 |
| Days to reach 2.0 poises | 15 | 11 | 33 | 59 | 31 | 59 | 63 |
| Days to reach 2.5 poises | 35 | 15 | 41 | 65 | 41 | 65 | 70 |

Example 3

*Resin A.*—1623 parts of melamine were added to 2089 parts of 37% aqueous formaldehyde solution and the pH of the slurry was adjusted to 8.75 with sodium hydroxide. The mixture was condensed at 85° C. until one part of the resinous condensate formed a cloud when diluted with 3 parts of water. The pH of the solution was adjusted to 10.6 with sodium hydroxide and 30 parts of isopropyl alcohol were added. The pH of a portion of the final solution was adjusted to 9.4 with formic acid and this portion was designated Resin A.

*Resin B.*—A second portion of the final solution was combined with 0.5% 2-propanol triethanol ammonium hydroxide and 4.0% 2-nitro-2-ethyl-1,3 propanediol.

*Resin C.*—A third portion of the final solution was combined with 0.5% 2-propanol triethanol ammonium hydroxide and 8.0% 2-nitro-2-ethyl-1,3 propanediol.

The aging properties of the three resins at 25° C. were as follows:

|  | Resin A | Resin B | Resin C |
| --- | --- | --- | --- |
| Initial viscosity, poises at 25° C | 2.24 | 2.22 | 2.00 |
| Days to reach 3.0 poises | 8 | 15 | 23 |
| Days to reach 5.0 poises | 10 | 22 | 30 |

Example 4

A liquid melamine resin was prepared in the manner described in Example 1 with 3542 parts of melamine and 6267 parts of 37% aqueous formaldehyde solution except that isopropyl alcohol was not added to the resin solution. The solution was divided into two portions one of which was designated Resin A and the other, to which 4% 2-nitro-2-ethyl-1,3 propanediol was added, was designated Resin B. The aging properties of the two resins at 25° C. were as follows:

|  | Resin A | Resin B |
| --- | --- | --- |
| Initial viscosity, poises at 25° C | 1.05 | 0.86 |
| Days to reach 2.5 poises | 27 | 36 |

Example 5

3542 parts of melamine were added to 6267 parts of 37% formaldehyde and the slurry pH was adjusted to 8.94 with caustic soda (25% solution). The mixture was heated to reflux and condensed under reflux to a point where one part of resin formed a cloud when diluted with 1.5 parts of distilled water. The pH was then adjusted to 10.1 with caustic soda (25% solution) and 99 parts of isopropyl alcohol (99%) were added. Resin was cooled to 35° C. and the following mixtures were prepared:

|  | Mix No. 1 | Mix No. 2 | Mix No. 3 | Mix No. 4 |
|---|---|---|---|---|
| 2-Nitropropane, percent added | | 4.0 | 4.0 | 8.0 |
| 2-Propanol-Triethanol Ammonium Hydroxide, percent added | | | 0.5 | 0.5 |
| Aging Properties at 25° C.: | | | | |
| Initial Viscosity (poises) 25° C | 1.12 | 1.05 | 0.85 | 0.90 |
| Days to Reach 2.0 poises | 17 | 69 | 78 | 95 |
| Days to Reach 2.5 poises | 39 | 90 | 95 | 117 |

Example 6

3246 parts of melamine were added to 5223 parts of 37% aqueous formaldehyde solution and the pH of the slurry was adjusted to 8.45 with sodium hydroxide. The mixture was refluxed until one part of the resin formed a cloud when diluted with 2.5 parts of water. The pH was then adjusted to 10.3 with sodium hydroxide and the resin solution was cooled to 60° C. At this temperature 246 parts of isopropyl alcohol, 546 parts of the formaldehyde solution used initially and 546 parts of a mixture of ortho and para toluene sulfonamides were added to the solution. The mixture was agitated until complete solution was obtained and then cooled.

Portions of the above prepared resin were modified with 4% and 8% of 2-nitro-2-ethyl-1,3 propanediol by dissolving the nitro compound in the resin solution at room temperature. The aging properties of the modified and unmodified resins at 25° were as follows:

|  | Unmodified | 4% nitro | 8% nitro |
|---|---|---|---|
| Initial viscosity, poises | 1.28 | 1.05 | 1.00 |
| Days to reach 2.5 poises | 33 | 49 | 50 |
| Initial water tolerance | 59 | 76 | 82 |
| Days to reach 30% water tolerance | 28 | 52 | 56 |

Example 7

3542 parts of melamine were added to 6267 parts of 37% aqueous formaldehyde solution and the pH of the slurry was adjusted to 8.0 with sodium hydroxide. The mixture was heated to 90° C. and maintained at 90° C. and a pH above 8.0 for three hours. At this point, one part of resin formed a cloud when diluted with one part of water. The pH was then adjusted to 9.5 with sodium hydroxide and the resin was cooled to 25° C. Ninety-nine parts of isopropyl alcohol were then added to the resin solution. The resin was divided into three parts, and the 2-nitro-1-butanol was added as indicated below.

|  | Part A | Part B | Part C |
|---|---|---|---|
| Unmodified Melamine Formaldehyde Resin | 1,000 | 1,000 | 1,000 |
| 2-Nitro-1-Butanol | | 40 | 40 |
| 2-Propanol triethanol ammonium hydroxide | | | 5 |
| Aging Properties @ 25° C.: | | | |
| Initial Viscosity, poises | 1.68 | 1.34 | 1.42 |
| Days to reach 2.0 poises | 9 | 18 | 23 |
| Days to reach 2.5 poises | 21 | 35 | 42 |

It is an important feature of our invention that the modified liquid melamine resins will cure under high heat and pressure in relatively short compression molding times, substantially less than 30 seconds, to form a uniform high gloss hard surface equivalent to that of a conventional unplasticized melamine resin cured at substantially longer molding times. The conventional unplasticized resin when subjected to the rapid molding times develops surface defects such as cracks and other undesirable appearance characteristics.

It will be understood that it is intended to cover all changes and modifications of the preferred embodiment of the invention herein chosen for the purpose of illustration which do not depart from the spirit and scope of the invention.

We claim:

1. An improved liquid resinous composition which comprises a mixture of a melamine-formaldehyde condensate of 1 mol melamine and from about 1.5 to 4.5 mols formaldehyde and from about 0.5% to about 13%, based on the weight of said condensate, of an organic nitro compound having the formula:

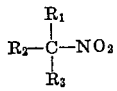

wherein $R_1$ is selected from the group consisting of hydrogen and methylol, $R_2$ is selected from the group consisting of hydrogen and $C_nH_{2n+1}$, $R_3$ is selected from the group consisting of hydrogen, methylol and $C_nH_{2n+1}$, and $n$ is a number from 1 to 12, said mixture having an alkaline pH.

2. A composition in accordance with claim 1 containing at least about 1.5% of said nitro compound based on the weight of said condensate.

3. An improved liquid resinous composition which comprises a mixture of a melamine-formaldehyde condensate of 1 mol melamine and from about 1.5 to about 4.5 mols formaldehyde, from about 0.4% to about 3.5%, based on the weight of said condensate, of a quaternary ammonium hydroxide compound having from one to four hydroxyalkyl groups and from about 0.5% to about 25%, based on the weight of said condensate, of an organic nitro compound having the formula:

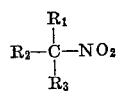

wherein $R_1$ is selected from the group consisting of hydrogen and methylol, $R_2$ is selected from the group consisting of hydrogen and $C_nH_{2n+1}$, $R_3$ is selected from the group consisting of hydrogen, methylol and $C_nH_{2n+1}$, and $n$ is a number from 1 to 12, said mixture having an alkaline pH.

4. A composition in accordance with claim 3 in which said organic nitro compound is 2-nitro-2-ethyl-1,3-propanediol and the quaternary ammonium hydroxide compound is 2-propanol triethanol ammonium hydroxide.

5. A composition in accordance with claim 3 dissolved in a mixture of water and isopropyl alcohol.

6. In the manufacture of liquid resinous compositions by reacting 1 mol melamine with from about 1.5 to about 4.5 mols formaldehyde to form a melamine-formaldehyde condensate, the improvement which comprises mixing with said condensate from about 0.5% to about 13%, based on the weight of said condensate, of an organic nitro compound having the formula:

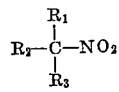

wherein $R_1$ is selected from the group consisting of hydrogen and methylol, $R_2$ is selected from the group consisting of hydrogen and $C_nH_{2n+1}$, $R_3$ is selected from the group consisting of hydrogen, methylol and $C_nH_{2n+1}$, and $n$ is a number from 1 to 12, and establishing an alkaline pH in the mixture.

7. In the manufacture of liquid resinous compositions by reacting 1 mol melamine with from about 1.5 to about 4.5 mols formaldehyde to form a melamine-formaldehyde condensate, the improvement which comprises mixing with said condensate from about 0.4% to about 3.5%, based on the weight of said condensate, of a quaternary ammonium hydroxide compound having from one to four hydroxyalkyl groups and from about 0.5% to about 25%, based on the weight of said condensate, of an organic nitro compound having the formula:

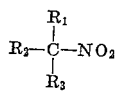

wherein $R_1$ is selected from the group consisting of hydrogen and methylol, $R_2$ is selected from the group consisting of hydrogen and $C_nH_{2n+1}$, $R_3$ is selected from the group consisting of hydrogen, methylol and $C_nH_{2n+1}$, and $n$ is a number from 1 to 12, and establishing an alkaline pH in the mixture.

References Cited in the file of this patent
UNITED STATES PATENTS

| | | |
|---|---|---|
| 2,457,404 | Scott | Dec. 28, 1948 |
| 2,484,315 | Scott | Oct. 11, 1949 |